(12) United States Patent
Matsui et al.

(10) Patent No.: US 10,121,240 B2
(45) Date of Patent: Nov. 6, 2018

(54) FAILURE DETECTION SYSTEM, INFORMATION PROCESSING DEVICE, AND VEHICLE-MOUNTED DEVICE

(71) Applicant: DENSO CORPORATION, Kariya, Aichi-pref. (JP)

(72) Inventors: Ryohei Matsui, Kariya (JP); Yoshio Koie, Kariya (JP); Takahisa Yamashiro, Kariya (JP); Hiroaki Ogawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 128 days.

(21) Appl. No.: 15/104,214

(22) PCT Filed: Apr. 7, 2015

(86) PCT No.: PCT/JP2015/001958
§ 371 (c)(1),
(2) Date: Jun. 13, 2016

(87) PCT Pub. No.: WO2015/159504
PCT Pub. Date: Oct. 22, 2015

(65) Prior Publication Data
US 2016/0379350 A1 Dec. 29, 2016

(30) Foreign Application Priority Data

Apr. 17, 2014 (JP) .................................. 2014-085541
Dec. 18, 2014 (JP) .................................. 2014-256370

(51) Int. Cl.
*B60Q 11/00* (2006.01)
*G07C 5/00* (2006.01)
(Continued)

(52) U.S. Cl.
CPC ............ *G06T 7/001* (2013.01); *B60C 11/005* (2013.01); *B60Q 1/44* (2013.01); *G01J 1/4228* (2013.01);
(Continued)

(58) Field of Classification Search
CPC . G06T 7/001; G06T 2207/30252; B60Q 1/44; B60Q 11/005; G01J 1/4228; G06K 9/00825; G07C 5/008
See application file for complete search history.

(56) References Cited

U.S. PATENT DOCUMENTS 6,529,808 B1 * 3/2003 Diem .................... G01R 31/006
701/31.5
9,103,743 B2 * 8/2015 Couch ................... G01M 17/00
(Continued)

FOREIGN PATENT DOCUMENTS

JP      H06262988 A    9/1994
JP      2008055932 A    3/2008
(Continued)

*Primary Examiner* — Brian Yenke
(74) *Attorney, Agent, or Firm* — Harness, Dickey & Pierce, P.L.C.

(57) ABSTRACT

A failure detection system includes: an information processing device mounted in a vehicle or installed on a road; and a vehicle-mounted device mounted in another vehicle. The information processing device includes: a lighting determination device of a rear lamp of a periphery vehicle; an acquisition device of vehicle identification information of the periphery vehicle; and a transmission control device transmitting result information of lighting determination and the vehicle identification information to the vehicle-mounted device. The vehicle-mounted device includes: a vehicle determination device determining whether the periphery vehicle is the another vehicle; and an output device producing an output in accordance with the result
(Continued)

information when the periphery vehicle is the another vehicle.

13 Claims, 9 Drawing Sheets

(51) Int. Cl.
  *B60Q 1/44* (2006.01)
  *G06K 9/00* (2006.01)
  *G06T 7/00* (2017.01)
  *B60C 11/00* (2006.01)
  *G01J 1/42* (2006.01)

(52) U.S. Cl.
  CPC ......... *G06K 9/00825* (2013.01); *G07C 5/008* (2013.01); *G06T 2207/30252* (2013.01)

(56) References Cited

U.S. PATENT DOCUMENTS

| | | | | |
|---|---|---|---|---|
| 9,108,570 | B2* | 8/2015 | Giangrande | B60Q 1/44 |
| 9,251,630 | B2* | 2/2016 | Denny | B60W 30/09 |
| 9,468,072 | B2* | 10/2016 | Sasaki | B60Q 1/44 |
| 9,527,443 | B2* | 12/2016 | Ryu | B60R 1/00 |
| 9,630,555 | B1* | 4/2017 | Prakah-Asante | B60Q 9/00 |
| 9,697,653 | B2* | 7/2017 | Denny | G07C 5/008 |
| 9,815,467 | B2* | 11/2017 | Park | B60W 18/109 |
| 9,873,377 | B2* | 1/2018 | Jeong | B60Q 1/44 |
| 2007/0296961 | A1 | 12/2007 | Sekine et al. | |
| 2008/0082233 | A1* | 4/2008 | Hayashi | B60Q 1/444 |
| | | | | 701/36 |
| 2009/0096635 | A1* | 4/2009 | McKenna | G08G 1/0965 |
| | | | | 340/901 |
| 2010/0066529 | A1* | 3/2010 | Haines | B60Q 1/44 |
| | | | | 340/479 |
| 2010/0090821 | A1* | 4/2010 | Gallon | B60Q 1/44 |
| | | | | 340/479 |
| 2011/0057786 | A1* | 3/2011 | Giddens | B60Q 1/302 |
| | | | | 340/479 |
| 2012/0044066 | A1* | 2/2012 | Mauderer | B60T 7/22 |
| | | | | 340/479 |
| 2014/0015666 | A1* | 1/2014 | Rohr | B60Q 1/44 |
| | | | | 340/479 |
| 2014/0070938 | A1* | 3/2014 | Park | B60Q 1/445 |
| | | | | 340/467 |
| 2014/0097748 | A1* | 4/2014 | Kato | B60Q 9/008 |
| | | | | 315/77 |
| 2014/0313027 | A1* | 10/2014 | Johnson | B60Q 11/005 |
| | | | | 340/458 |
| 2014/0375448 | A1* | 12/2014 | Lee | B60Q 1/444 |
| | | | | 340/479 |
| 2015/0022426 | A1* | 1/2015 | Ng-Thow-Hing | G06T 19/00 |
| | | | | 345/7 |
| 2015/0127214 | A1* | 5/2015 | Watanabe | B60Q 1/44 |
| | | | | 701/34.4 |
| 2015/0137961 | A1* | 5/2015 | Bean | B60Q 11/005 |
| | | | | 340/431 |
| 2015/0195518 | A1* | 7/2015 | Shikii | B60R 25/1006 |
| | | | | 348/148 |
| 2015/0251593 | A1* | 9/2015 | Zhou | F21S 48/20 |
| | | | | 362/541 |
| 2015/0266411 | A1* | 9/2015 | Bennie | B60W 10/06 |
| | | | | 701/36 |
| 2015/0266415 | A1* | 9/2015 | Sasaki | B60Q 1/44 |
| | | | | 315/79 |
| 2015/0336509 | A1* | 11/2015 | Davis | B60Q 11/005 |
| | | | | 362/511 |
| 2016/0107565 | A1* | 4/2016 | Pino Mendez | B60Q 1/46 |
| | | | | 701/36 |
| 2016/0257242 | A1* | 9/2016 | Bauch | B60Q 1/22 |
| 2016/0332562 | A1* | 11/2016 | Kim | B60Q 1/0076 |
| 2017/0021829 | A1* | 1/2017 | Nishimura | B60Q 1/346 |
| 2017/0144598 | A1* | 5/2017 | Jeong | B60Q 11/005 |
| 2017/0240125 | A1* | 8/2017 | Weigert | B60Q 1/34 |
| 2017/0259729 | A1* | 9/2017 | Balasundrum | B60Q 3/30 |
| 2017/0274815 | A1* | 9/2017 | Zelman | B60Q 1/44 |
| 2017/0301153 | A1* | 10/2017 | Denny | B60W 30/09 |
| 2017/0313240 | A1* | 11/2017 | Randolph | B60Q 1/44 |
| 2017/0330464 | A1* | 11/2017 | Yoo | G08G 1/166 |
| 2017/0349092 | A1* | 12/2017 | Chang | B60Q 1/441 |
| 2017/0355303 | A1* | 12/2017 | Reyes | B60Q 1/503 |
| 2018/0027231 | A1* | 1/2018 | Shikii | H04N 5/33 |

FOREIGN PATENT DOCUMENTS

| | | |
|---|---|---|
| JP | 2014160419 A | 9/2014 |
| WO | WO-2006057363 A1 | 6/2006 |

* cited by examiner

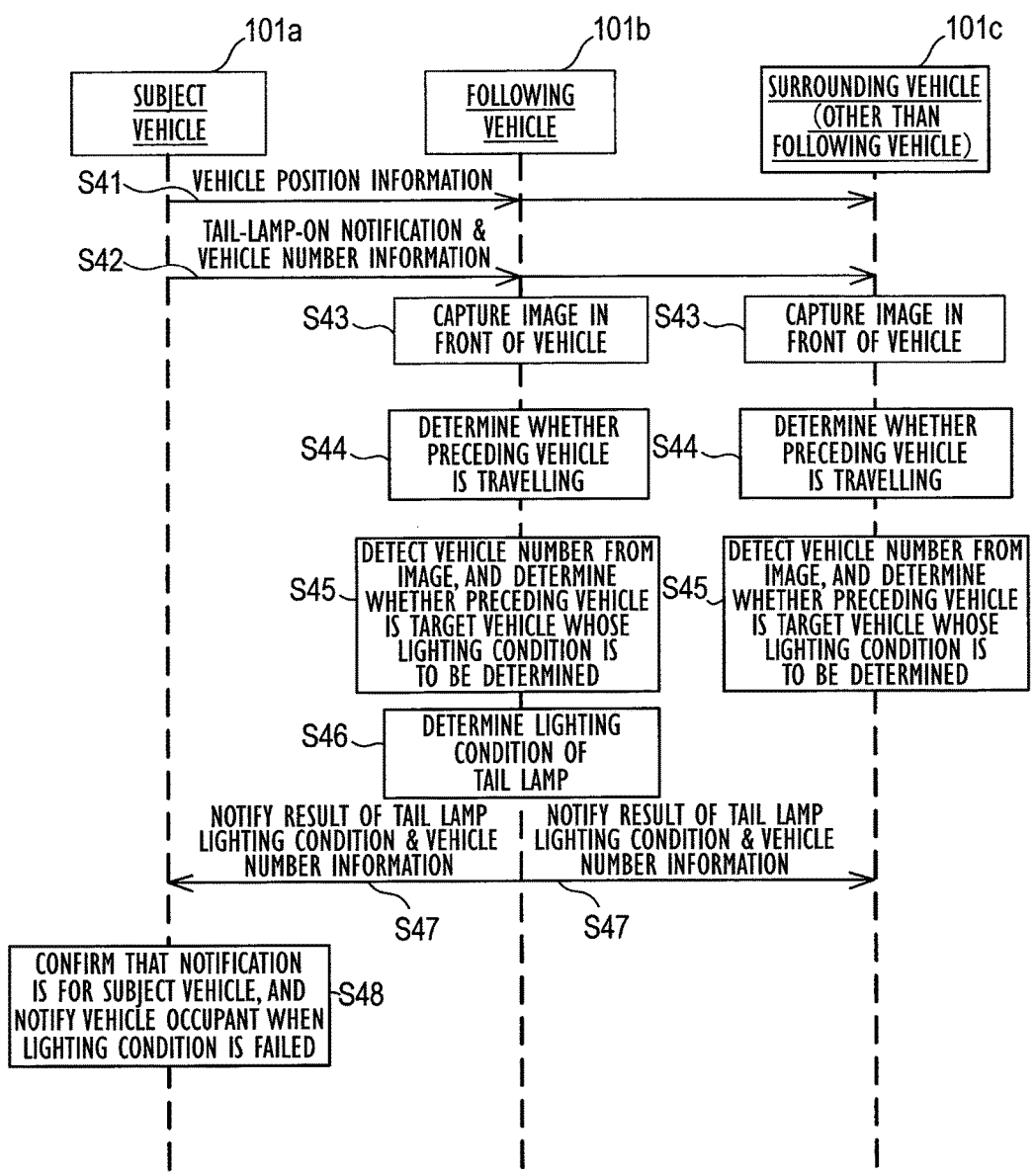

FAILURE DETECTION SYSTEM, INFORMATION PROCESSING DEVICE, AND VEHICLE-MOUNTED DEVICE

CROSS REFERENCE TO RELATED APPLICATIONS

This application is a U.S. National Phase Application under 35 U.S.C. 371 of International Application No. PCT/JP2015/001958 filed on Apr. 7, 2015 and published in Japanese as WO 2015/159504 A1 on Oct. 22, 2015. This application is based on and claims the benefit of priority from Japanese Patent Applications No. 2014-085541 filed on Apr. 17, 2014, and No. 2014-256370 filed on Dec. 18, 2014. The entire disclosures of all of the above applications are incorporated herein by reference.

TECHNICAL FIELD

The present disclosure relates to a failure detection system, an information processing device, and a vehicle-mounted device, which detect a failure of a vehicle.

BACKGROUND ART

There is known a technique for detecting that a brake lamp provided in a vehicle is in the condition of not being able to be lighted due to burnout of the lamp or a failure in a lamp drive circuit (see Patent Literature 1).

In the above technique of Patent Literature 1, a failure in the circuit or the like is determined to electrically detect a failure, and hence it is not possible to confirm whether or not lighting of the brake lamp can actually be visually recognized from the outside.

PRIOR ART LITERATURES

Patent Literature

Patent Literature 1: JP-2008-55932-A

SUMMARY OF INVENTION

It is an object of the present disclosure to provide a failure detection system, an information processing device, and a vehicle-mounted device, which enable a failure in a lamp provided at the rear of a vehicle to be confirmed from the outside of the vehicle.

According to a first aspect of the present disclosure, a failure detection system includes: an information processing device mounted in a vehicle or installed on a road; and a vehicle-mounted device mounted in another vehicle different from the vehicle. The information processing device and the vehicle-mounted device are communicable with each other by wireless communication. The information processing device includes: a lighting determination device that performs a lighting determination for determining whether a lamp turns on, based on a captured image captured by an imaging device for capturing an image of a periphery of the information processing device, the lamp being arranged at a rear of further another vehicle on the periphery of the information processing device; an acquisition device that acquires vehicle identification information for identifying the further another vehicle as a target for the lighting determination of the lighting determination device; and a transmission control device that transmits result information and the vehicle identification information acquired by the acquisition device to the vehicle-mounted device, the result information showing a result of the lighting determination of the lighting determination device. The vehicle-mounted device includes: a vehicle determination device that determines whether the further another vehicle, identified by the vehicle identification information transmitted by the transmission control device, is the another vehicle mounting the vehicle-mounted device; and an output device that produces an output in accordance with the result shown in the result information when the vehicle determination device determines that the further another vehicle identified by the vehicle identification information is the another vehicle mounting the vehicle-mounted device.

In the failure detection system as thus configured, the information processing device checks whether or not a light of the lamp is actually being visually recognized from the outside of the vehicle, and notifies a result thereof to the vehicle-mounted device mounted in the vehicle having been an object to be checked.

Accordingly, in the above failure detection system, a failure in the lamp provided at the rear of the vehicle can be detected from the viewpoint of whether or not visual recognition is actually possible. As a result, for example, it is possible to detect even a failure which has not been detectable by the device that electrically detects an abnormality from a circuit condition or the like, so as to enhance the accuracy in failure detection.

According to a second aspect of the present disclosure, an information processing device provides the failure detection system according to the first aspect.

The above information processing device provides the failure detection system capable of detecting a failure in the lamp provided at the rear of the vehicle from the viewpoint of whether or not visual recognition is actually possible. As a result, for example, it is possible to detect even a failure which has not been detectable by the device that electrically detects a failure from a circuit condition or the like, so as to enhance the accuracy in failure detection.

According to a third aspect of the present disclosure, a vehicle-mounted device provides the failure detection system according to the first aspect.

The above vehicle-mounted device provides the failure detection system capable of detecting a failure in the lamp provided at the rear of the vehicle from the viewpoint of whether or not visual recognition is actually possible. As a result, for example, it is possible to detect even a failure which has not been detectable by the device that electrically detects a failure from a circuit condition or the like, so as to enhance the accuracy in failure detection.

According to a fourth aspect of the present disclosure, an information processing device is mounted in a vehicle or installed on a road, and provides a failure detection system with a vehicle-mounted device mounted in another vehicle different from the vehicle. The information processing device and the vehicle-mounted device are communicable with each other by wireless communication. The information processing device includes: a lighting determination device that performs a lighting determination for determining whether a lamp turns on, based on a captured image captured by an imaging device for capturing an image of a periphery of the information processing device, the lamp being arranged at a rear of further another vehicle on the periphery of the information processing device; an acquisition device that acquires vehicle identification information for identifying the further another vehicle as a target for the lighting determination of the lighting determination device; and a transmission control device that transmits result information and the vehicle identification information acquired by the acquisition device to the vehicle-mounted device, the result information showing a result of the lighting determination of the lighting determination device. The vehicle-mounted device includes: a vehicle determination device that determines whether the further another vehicle, identified by the vehicle identification information transmitted by the transmission control device, is the another vehicle mounting the vehicle-mounted device; and an output device that produces an output in accordance with the result shown in the result information when the vehicle determination device determines that the further another vehicle identified by the vehicle identification information is the another vehicle mounting the vehicle-mounted device.

The above information processing device provides the failure detection system capable of detecting a failure in the lamp provided at the rear of the vehicle from the viewpoint of whether or not visual recognition is actually possible. As a result, for example, it is possible to detect even a failure which has not been detectable by the device that electrically detects a failure from a circuit condition or the like, so as to enhance the accuracy in failure detection.

According to a fifth aspect of the present disclosure, a vehicle-mounted device provides a failure detection system with an information processing device mounted in a vehicle or installed on a road. The vehicle-mounted device is mounted in another vehicle different from the vehicle. The information processing device and the vehicle-mounted device are communicable with each other by wireless communication. The information processing device includes: a lighting determination device that performs a lighting determination for determining whether a lamp turns on, based on a captured image captured by an imaging device for capturing an image of a periphery of the information processing device, the lamp being arranged at a rear of further another vehicle on the periphery of the information processing device; an acquisition device that acquires vehicle identification information for identifying the further another vehicle as a target for the lighting determination of the lighting determination device; and a transmission control device that transmits result information and the vehicle identification information acquired by the acquisition device to the vehicle-mounted device, the result information showing a result of the lighting determination of the lighting determination device. The vehicle-mounted device includes: a vehicle determination device that determines whether the further another vehicle, identified by the vehicle identification information transmitted by the transmission control device, is the another vehicle mounting the vehicle-mounted device; and an output device that produces an output in accordance with the result shown by the result information when the vehicle determination device determines that the further another vehicle identified by the vehicle identification information is the another vehicle mounting the vehicle-mounted device.

The above vehicle-mounted device provides the failure detection system capable of detecting a failure in the lamp provided at the rear of the vehicle from the viewpoint of whether or not visual recognition is actually possible. As a result, for example, it is possible to detect even a failure which has not been detectable by the device that electrically detects a failure from a circuit condition or the like, so as to enhance the accuracy in failure detection.

BRIEF DESCRIPTION OF DRAWINGS

The above and other objects, features and advantages of the present disclosure will become more apparent from the following detailed description made with reference to the accompanying drawings. In the drawings:

FIG. 9 is a sequence diagram explaining processing of a failure detection system in another embodiment.

EMBODIMENTS FOR CARRYING OUT INVENTION

Hereinafter, embodiments of the present disclosure will be described with reference to the drawings. The present disclosure is not limited to the embodiments described below but can be achieved in various modes within the range not departing from the purpose of the invention.

First Embodiment (1) Overall Configuration

Figure 1:
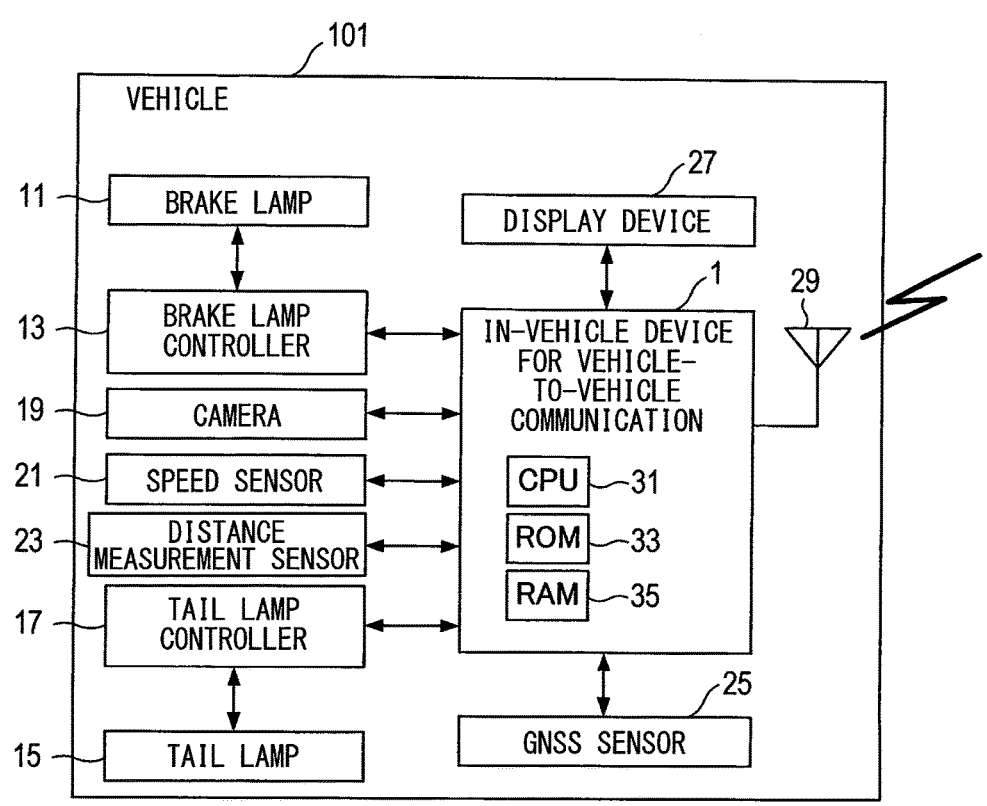
FIG. 1 is a block diagram showing a configuration of an in-vehicle device 1 that constitutes a failure detection system in a first embodiment.

A failure detection system of the present embodiment is made up of a plurality of in-vehicle devices 1 for vehicle-to-vehicle communication (hereinafter also referred to simply as in-vehicle devices 1). The in-vehicle device 1 is used as being mounted in a vehicle 101, as shown in FIG. 1. The in-vehicle device 1 is an example of the information processing device and the vehicle-mounted device in the present disclosure.

The in-vehicle device 1 has a vehicle-to-vehicle communication function to periodically wirelessly transmit data in a broadcast system via an antenna 29 to an unspecified large number of other in-vehicle devices 1 that are present on the periphery of the in-vehicle device 1 (within a communication area in which radio waves reach).

Other than the in-vehicle device 1, the vehicle 101 is mounted with a brake lamp 11, a brake lamp controller 13, a tail lamp 15, a tail lamp controller 17, a camera 19, a speed sensor 21, a distance measurement sensor 23, a GNSS sensor 25, a display device 27, and the like.

The brake lamp 11 is a plurality of lamps that are arranged at the rear end of an exterior of the vehicle, and are lighted when a driver of the vehicle operates a brake, not shown. The brake lamp controller 13 detects that the brake has been operated, and supplies electric power to the brake lamp 11, to light the brake lamp 11. Further, the brake lamp controller 13 outputs, to the in-vehicle device 1, a signal indicating that the brake has been operated.

The tail lamp 15 is a plurality of lamps that are arranged at the rear end of the exterior of the vehicle, and are lighted when the driver of the vehicle operates a switch, not shown. When the switch is operated, the tail lamp controller 17 supplies electric power to the tail lamp 15, to light the tail lamp 15. Further, the tail lamp controller 17 outputs, to the in-vehicle device 1, a signal indicating that the switch has been operated.

The camera 19 is a camera such as a CCD camera, a camera using an imaging tube, or an infrared camera capable of acquiring an infrared image. The camera 19 is mounted on a central front side of the vehicle 101, to capture an image of a scene in front of the vehicle (a traveling direction), including a road surface, in accordance with a command from the in-vehicle device 1. The image captured by this camera 19 is outputted to the in-vehicle device 1.

The speed sensor 21 is a sensor for outputting a detection signal in accordance with a traveling speed of the vehicle.

The distance measurement sensor 23 is a sensor for detecting an object present in front of the vehicle, such as a millimeter radar or a laser radar arranged at the front of the vehicle, and by setting the traveling direction of the vehicle as a detection range, the distance measurement sensor 23 can detect a relative position of another vehicle located in front of the vehicle.

The GNSS (Global Navigation Satellite System) sensor 25 has an antenna for detecting a signal outputted from an artificial satellite for GNSS, and specifies a current position of the vehicle based on the detection signal.

The display device 27 is a device having a display screen for displaying an image, such as a liquid crystal display, and displays an image in accordance with a control signal from the in-vehicle device 1.

The foregoing in-vehicle device 1 is a known microcomputer made up of: a CPU 31; a ROM 33 that stores a program and the like to be executed by the CPU 31; a RAM 35 that is used as an operation region at the time of execution of the program by the CPU 31; and a bus line, not shown, for connecting these. The in-vehicle device 1 executes a variety of processing other than the vehicle-to-vehicle communication described above. The CPU 31 of the in-vehicle device 1 is an example of the lighting determination device, the acquisition device, the transmission control device, the vehicle determination device, the output device, the stopping determination device, the traveling determination device, the second transmission control device, the second vehicle determination device, the third transmission control device, the fourth transmission control device, the information extraction device, the fifth transmission control device, and the execution determination device in the present disclosure.

(2) Processing by In-Vehicle Device 1

Figure 2:
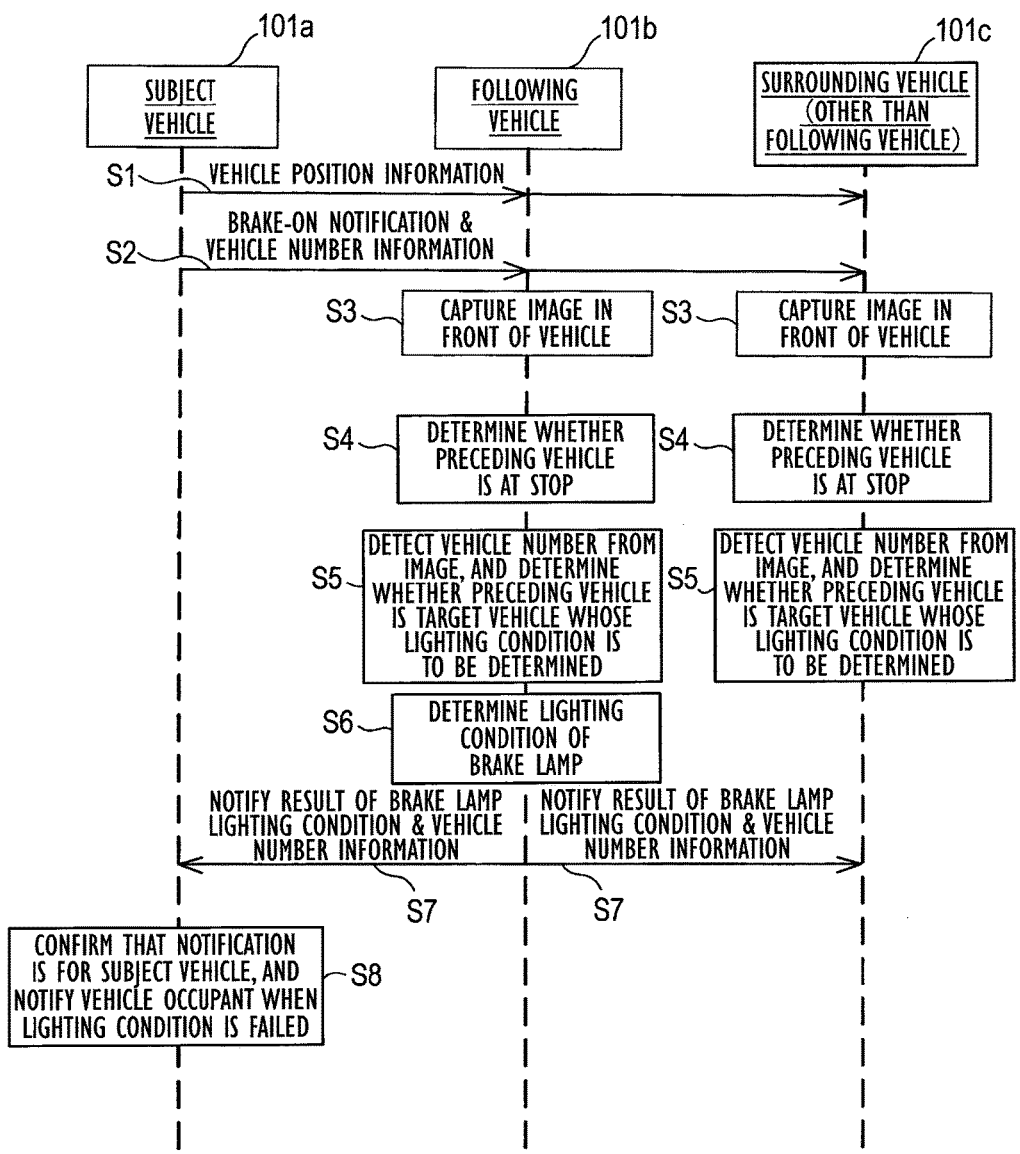
FIG. 2 is a sequence diagram explaining processing of the failure detection system in the first embodiment.

The failure detection system of the present embodiment is a system for detecting a failure of the brake lamp 11 of the vehicle. Specific processing in the in-vehicle device 1 constituting the failure detection system will be described with reference to a sequence diagram shown in FIG. 2.

The in-vehicle device 1 is mounted in a subject vehicle 101a which is a vehicle to be a target for failure detection on the brake lamp 11, a following vehicle 101b which is located behind the subject vehicle 101a and detects a failure of the brake lamp 11 of the subject vehicle 101a, and a surrounding vehicle 101c which is located on the periphery of the subject vehicle 101a and is not located immediately behind the subject vehicle 101a. Each of the in-vehicle devices 1 executes different processing, to detect a failure of the brake lamp 11 of the subject vehicle 101a.

The surrounding vehicle 101c means all vehicles that are present within a communication area of the subject vehicle 101a and mounted with the in-vehicle device 1, and exclude the following vehicle 101b.

In the description below, main constituents to execute the processing are CPUs 31 of the in-vehicle devices 1 respectively mounted in the subject vehicle 101a, the following vehicle 101b, and the surrounding vehicle 101c. However, they will be simply described as the subject vehicle 101a, the following vehicle 101b, and the surrounding vehicle 101c for the sake of convenience. Further, when simply described as the "self-vehicle", it means a vehicle mounted with the in-vehicle device 1 that is a main constituent in processing or the like explained in the description.

In the present embodiment, processing for the failure detection is started when a brake is operated in the subject vehicle 101a.

In S1, the subject vehicle 101a transmits vehicle position information, which is information showing the current position of the subject vehicle 101a, to the outside. Further, the following vehicle 101b and the surrounding vehicle 101c receive the vehicle position information. In the description below, "transmit . . . to the outside" means transmitting a signal to vehicles other than the transmitting source vehicle by the vehicle-to-vehicle communication function. In this case, the following vehicle 101b and the surrounding vehicle 101c correspond to the vehicles other than the transmitting source vehicle.

In next S2, the subject vehicle 101a transmits brake-on notification and first vehicle number information to the outside. Further, the following vehicle 101b and the surrounding vehicle 101c receive the notification and the information. The vehicle number information is information of a number displayed on a number plate of the subject vehicle 101a (a car registered number, for example). The first vehicle number information is the number of the subject vehicle 101a, and is information that the in-vehicle device 1 mounted in the subject vehicle 101a stores in advance.

In next S3, taking the reception of the brake-on notification as a trigger, the following vehicle 101b and the surrounding vehicle 101c each make the camera 19 capture an image of a scene in front of each of the self-vehicles.

In next S4, the following vehicle 101b and the surrounding vehicle 101c each determine whether or not a preceding vehicle located in front of each of the self-vehicles is at a stop. Herein, the following vehicle 101b and the surrounding vehicle 101c each determine that the preceding vehicle is at a stop in a case where another vehicle (the preceding vehicle) is present in front of each of the self-vehicles, a vehicle speed of each of the self-vehicles is 0, and a distance between each of the self-vehicles and the preceding vehicle remains unchanged for a certain period of time (e.g., one second).

The case in which another vehicle is present in front of each of the self-vehicles is, for example, considered to be a case in which a distance to an object (vehicle) in front of each of the self-vehicles, detected by the distance measurement sensor 23, is not longer than a predetermined threshold. Further, the case also includes a case in which, when the following vehicle 101b and the surrounding vehicle 101c each compare the vehicle position information transmitted from the subject vehicle 101a in S1 with position information of each of the self-vehicles, the following vehicle 101b and the surrounding vehicle 101c can determine that another vehicle is located within a predetermined range and in front of each of the self-vehicles in the traveling direction.

A change in distance between each of the self-vehicles and another vehicle can be measured based on a detection signal of the distance measurement sensor 23 or position information of the preceding vehicle, acquired by the vehicle-to-vehicle communication, as in the case of detecting the presence of the vehicle described above.

In this S4, when the preceding vehicle is not at a stop, the following vehicle 101b and the surrounding vehicle 101c complete the processing. When the preceding vehicle is at a stop, the following vehicle 101b and the surrounding vehicle 101c shift the processing to S5.

In next S5, the following vehicle 101b and the surrounding vehicle 101c each detect a number of the preceding vehicle from the captured image of the scene in front of each of the self-vehicles, captured in S3, to determine whether or not the preceding vehicle is a target vehicle whose lighting condition is to be determined. Since a method for detecting a number from a captured image is known, a description thereof will be omitted. As an example, a technique described in JP-2006-155126-A can be used.

The following vehicle 101b and the surrounding vehicle 101c each compare the number detected from the captured image with the number transmitted from the subject vehicle 101a in S2. Then, the following vehicle 101b and the surrounding vehicle 101c determine that it is a vehicle whose lighting condition is to be determined when the numbers match, and determine that it is not the vehicle to be subjected to such determination when the numbers do not match.

In this S5, when it is not determined that the preceding vehicle is the vehicle whose lighting condition is to be determined, the subsequent processing is not executed. Since the preceding vehicle of the surrounding vehicle 101c is not the subject vehicle 101a, the process completes the processing in this S5. Since the preceding vehicle of the following vehicle 101b is the subject vehicle 101a, the process continues the processing.

In next S6, the following vehicle 101b performs lighting determination (determination of the lighting condition) on the brake lamp 11 from the captured image captured in S3. Since a method for detecting a lighting condition from a captured image is known, a description thereof will be omitted. As an example, a technique described in JP-H09-267686-A can be used.

In next S7, the following vehicle 101b transmits a determination result of the lighting condition of the brake lamp 11 and the first vehicle number information (the same as second vehicle number information) to the outside. Further, the subject vehicle 101a receives those pieces of information. The determination result of the lighting condition is either lighting or non-lighting. The outside mentioned herein corresponds to the subject vehicle 101a and the surrounding vehicle 101c.

In next S8, when the second vehicle number information transmitted in S7 matches with the number of the subject vehicle 101a, the subject vehicle 101a confirms that the result of the lighting condition, transmitted in S7, is notification to the subject vehicle 101a.

When the lighting condition is failed, the subject vehicle 101a makes it displayed on the display screen of the display device 27 that the brake lamp 11 is failed, to notify the vehicle occupant such as the driver of the failure. The determination result of the lighting condition, transmitted in S7, is a determination result obtained at a time when the subject vehicle 101a is at a stop, namely a determination result obtained at a time when the brake is likely to be in operation. Thus, the lighting condition can be determined to be failed by the fact that the brake lamp 11 is not lighting.

It is to be noted that, although the information is transmitted from the following vehicle 101b to the surrounding vehicle 101c in S7, the notified vehicle number information does not match with the number of the self-vehicle, and hence the surrounding vehicle 101c does not notify the vehicle occupant of the result of the lighting condition.

(3) Effect

The failure detection system of the present embodiment can confirm whether or not the light of the lamp is actually being visually recognized from the outside through use of the vehicle-to-vehicle communication. Hence it is possible to detect a failure which has not been detectable by the device that electrically detects a failure from a circuit condition or the like.

Further, in the failure detection system of the present embodiment, it is determined whether or not the lamp is lighting when the preceding vehicle is at a stop. When the vehicle is at a stop, the probability is high that the brake is in operation and the brake lamp 11 is lighting, and hence the transmitted lighting condition result is likely to be a result obtained at a time when the brake is in operation. Therefore, it is possible to suppress transmission of the result, obtained at a time when the brake is not in operation, to the in-vehicle device 1 of the subject vehicle 101a, so as to perform the failure determination with high accuracy.

In addition, the in-vehicle device 1 can also be configured to determine that the lamp is failed when the lamp lighting determination result received at the timing of the brake being in operation in the subject vehicle 101a is non-lighting of the lamp. However, in the first embodiment, the brake operation is the trigger for starting the processing, and whether or not the brake is in operation at the time of the reception is not determined. It is thus possible to suppress an adverse effect exerted due to a time lag in communication, namely occurrence of erroneous detection at a time when there is a deviation between the timing for reception of the determination result of the lamp and the timing for the brake operation.

Further, in the failure detection system of the present embodiment, the result of the lighting condition is transmitted only when the first vehicle number information received along with the brake-on notification matches with the number of the preceding vehicle, extracted from the captured image. It is thus possible to suppress transmission of a result of a lighting condition of the brake lamp 11 in the preceding vehicle regardless of it being a non-related the network.

Second Embodiment

Figure 3:
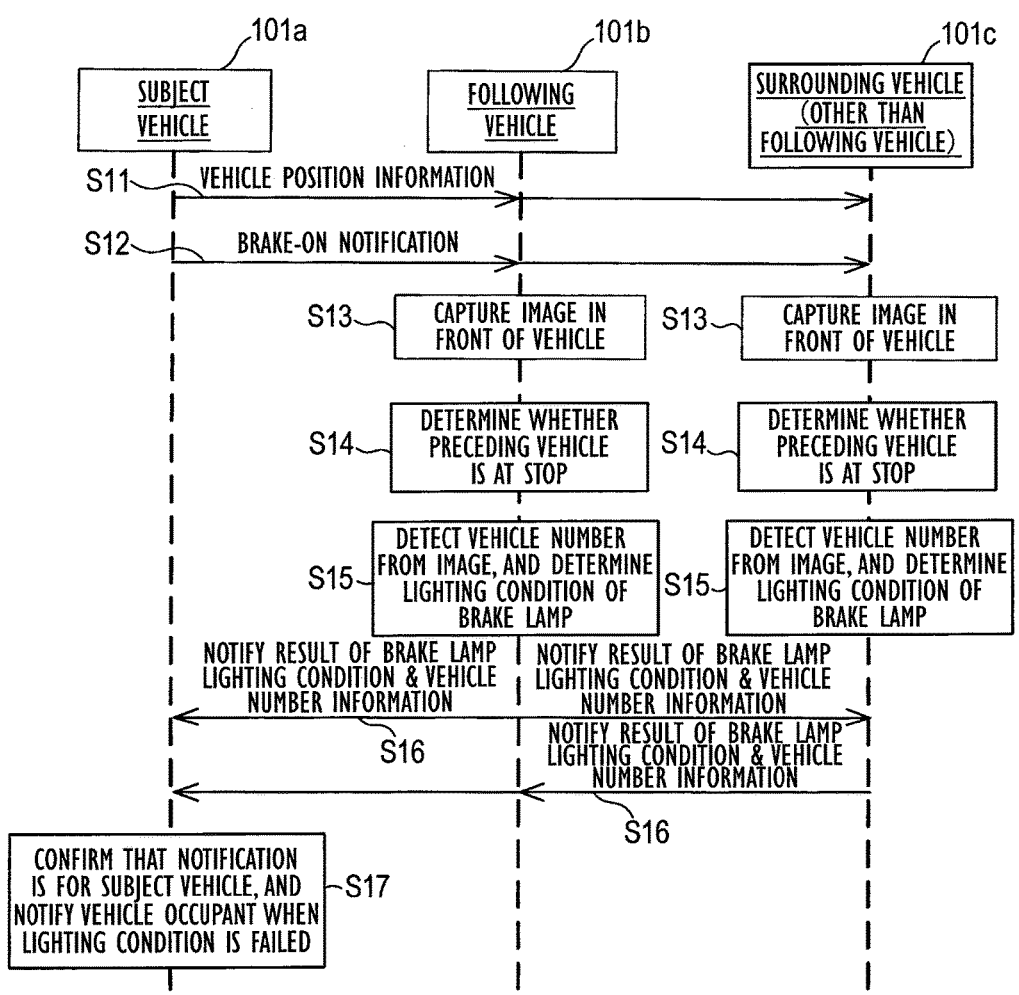
FIG. 3 is a sequence diagram explaining processing of a failure detection system in a second embodiment.

A failure detection system of a second embodiment uses an in-vehicle device 1 with the same hardware configuration as that of the in-vehicle device 1 of the first embodiment. However, contents of the processing in the in-vehicle device 1 are different. In the present embodiment, the subject vehicle 101a does not notify the first vehicle number information. Specific processing will be described based on a sequence diagram shown in FIG. 3.

(1) Processing by In-Vehicle Device 1

In the present embodiment, processing for the failure detection is started when a brake is operated in the subject vehicle 101a.

First, in S11, the subject vehicle 101a transmits vehicle position information to the outside, and the following vehicle 101b and the surrounding vehicle 101c receive the vehicle position information. This processing is similar to S1 of FIG. 2.

In next S12, the subject vehicle 101a transmits brake-on notification to the outside, and the following vehicle 101b and the surrounding vehicle 101c receive the brake-on notification. Notification of the first vehicle number information is not executed.

In next S13, taking the reception of the brake-on notification as a trigger, the following vehicle 101b and the surrounding vehicle 101c each make the camera 19 capture an image of a scene in front of each of the self-vehicles.

In next S14, the following vehicle 101b and the surrounding vehicle 101c each determine whether or not a preceding vehicle located in front of each of the self-vehicles is at a stop. This processing is similar to S4 of FIG. 2. In this S14, when the preceding vehicle is not at a stop, the following vehicle 101b and the surrounding vehicle 101c complete the processing. When the preceding vehicle is at a stop, the process shifts the processing to S15.

In next S15, the following vehicle 101b and the surrounding vehicle 101c each detect a number of the preceding vehicle from the captured image of the scene in front of each of the self-vehicles, the image being captured in S13, to determine the lighting condition of the brake lamp 11 from the captured image. Detection of the number is similar processing to the detection of the number in S5 of FIG. 2, and determination of the lighting condition is similar processing to S6 of FIG. 2.

In next S16, the following vehicle 101b and the surrounding vehicle 101c each transmit a determination result of the lighting condition of the brake lamp 11 and second vehicle number information to the outside. The in-vehicle devices 1 other than the transmitting source receive the result and the information.

The second vehicle number at this time is information of the number detected from the captured image in S15. Hence it does not necessarily match with the number of the vehicle of the subject vehicle 101a. The following vehicle 101b and the surrounding vehicle 101c are to transmit respectively different results of the lighting conditions and the numbers of the vehicles.

In next S17, when the second vehicle number information transmitted in S16 matches with the number of the subject vehicle 101a, the subject vehicle 101a confirms that the result of the lighting condition, transmitted in S16, is notification to the subject vehicle 101a. When the lighting condition is failed, the subject vehicle 101a makes it displayed on the display screen of the display device 27 that the brake lamp 11 is failed, to notify the failure to the vehicle occupant such as the driver.

In this S17, although the information is transmitted from each of the following vehicle 101b and the surrounding vehicle 101c. Since the second vehicle number information transmitted from the following vehicle 101b matches with the number of the self-vehicle, the subject vehicle 101a adopts the result of the lighting condition transmitted from the following vehicle 101b, and discards the data transmitted from the surrounding vehicle 101c.

(2) Effect

Similarly to the first embodiment, the failure detection system of the second embodiment can confirm whether or not the light of the lamp is actually being visually recognized from the outside.

Further, in the failure detection system of the present embodiment, the subject vehicle 101a can determine whether or not the transmitted information is the information for the subject vehicle in S17, without transmitting the first number information in S12.

Third Embodiment

A failure detection system of a third embodiment uses an in-vehicle device 1 with a basically similar hardware configuration to that of the in-vehicle device 1 of the first embodiment. However, in the present embodiment, the in-vehicle device 1 is configured so as to be able to acquire current time information, and store information of the time at which the brake has been operated by the RAM 35 or a NVRAM, not shown, based on a signal outputted from the brake lamp controller 13 and indicating that the brake has been operated. While a variety of methods can be adopted as a method for acquiring the time, the use of the time information acquired by the GNSS sensor 25 enables setting of the same time as a reference among a plurality of in-vehicle devices 1, which is convenient.

Figure 4:
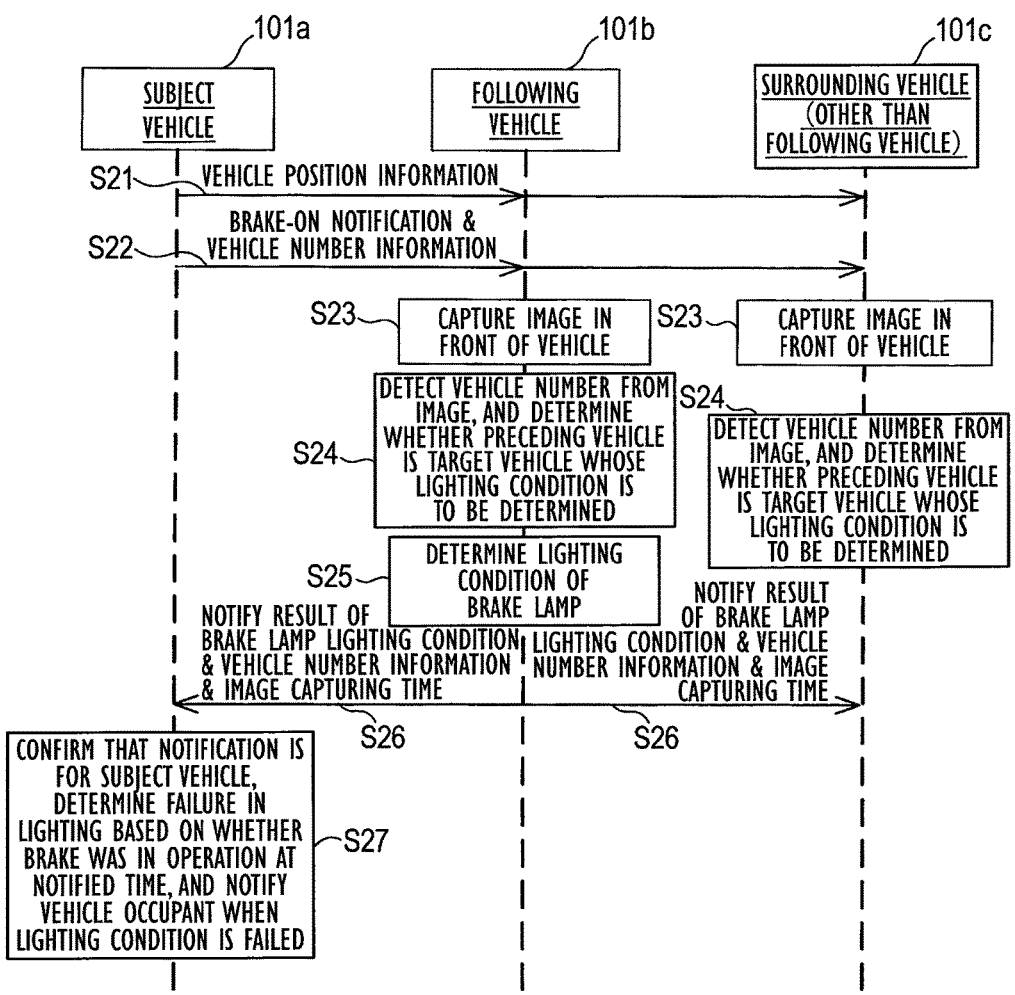
FIG. 4 is a sequence diagram explaining processing of a failure detection system in a third embodiment.

Further, the in-vehicle device 1 of the present embodiment is different in contents of the processing from the in-vehicle device 1 of the first embodiment. In the present embodiment, each of the following vehicle 101b and the surrounding vehicle 101c does not determine whether or not the preceding vehicle is at a stop. Specific processing will be described based on a sequence diagram shown in FIG. 4.

(1) Processing by In-Vehicle Device 1

In the present embodiment, processing for the failure detection is started when a brake is operated in the subject vehicle 101a.

First, in S21, the subject vehicle 101a transmits vehicle position information to the outside, and the following vehicle 101b and the surrounding vehicle 101c receive the vehicle position information. This processing is similar to S1 of FIG. 2.

In next S22, the subject vehicle 101a transmits brake-on notification and first vehicle number information to the outside, and the following vehicle 101b and the surrounding vehicle 101c receive the notification and the information. This processing is similar to S2 of FIG. 2.

In next S23, taking the reception of the brake-on notification as a trigger, the following vehicle 101b and the surrounding vehicle 101c each make the camera 19 capture an image of a scene in front of each of the self-vehicles.

In next S24, the following vehicle 101b and the surrounding vehicle 101c each detect a number of the preceding vehicle from the captured image of the scene in front of each of the self-vehicles, the image being captured in S23, to determine whether or not the preceding vehicle is a target vehicle whose lighting condition is to be determined. The following vehicle 101b and the surrounding vehicle 101c each compare the number detected from the captured image with the number transmitted in S22. Then, the following vehicle 101b and the surrounding vehicle 101c determine that it is a vehicle whose lighting condition is to be determined when the numbers match, and determine that it is not the vehicle to be subjected to such determination when the numbers do not match.

In this S24, when it is not determined that the preceding vehicle is the vehicle whose lighting condition is to be determined, the subsequent processing is not executed. Since the preceding vehicle of the surrounding vehicle 101c is not the subject vehicle 101a, the surrounding vehicle 101c completes the processing in this S24. Since the preceding vehicle of the following vehicle 101b is the subject vehicle 101a, the process continues the processing.

In next S25, the following vehicle 101b determines the lighting condition of the brake lamp 11 from the captured image.

In next S26, the following vehicle 101b transmits, to the outside, information of the time when the image, from which the lighting condition has been determined, was captured, in addition to the result of the lighting condition of the brake lamp 11 and the second vehicle number information. The subject vehicle 101a and the surrounding vehicle 101c receive the information and the result.

In next S27, when the second vehicle number information transmitted in S26 matches with the number of the subject vehicle 101a, the subject vehicle 101a confirms that the result of the lighting condition, transmitted in S26, is notification to the subject vehicle 101a.

Then, the subject vehicle 101a determines a failure in the lighting condition from the brake operation time information stored in the RAM 35 or the like, and the result of the lighting condition and the time information which were transmitted in S26. Specifically, the subject vehicle 101a determines that there is a failure in the brake lamp 11 when the brake lamp 11 is not lighting even at the time of the brake being in operation in the subject vehicle 101a, or when the brake lamp 11 is lighting even at the time of the brake being not in operation.

When the lighting condition is failed, the subject vehicle 101a makes it displayed on the display screen of the display device 27 that the brake lamp 11 is failed, to notify the failure to the vehicle occupant such as the driver.

(2) Effect

Similarly to the first embodiment, the failure detection system of the third embodiment can confirm whether or not the light of the lamp is actually being visually recognized from the outside.

Further, in the failure detection system of the present embodiment, the time at which the following vehicle 101b captured the image in S23 is checked with the time at which the subject vehicle 101a operated the brake, to detect a failure in the brake lamp 11. It is thus possible to execute the failure detection on the brake lamp 11 with higher accuracy.

Fourth Embodiment

A failure detection system of a fourth embodiment uses an in-vehicle device 1 with a basically similar hardware configuration to that of the in-vehicle device 1 of the first embodiment. However, the in-vehicle device 1 in the present embodiment is similar to the in-vehicle device 1 of the third embodiment in storing information of the time at which the brake was operated by the RAM 35 or the like based on a signal outputted from the brake lamp controller 13 and indicating that the brake has been operated.

Figure 5:
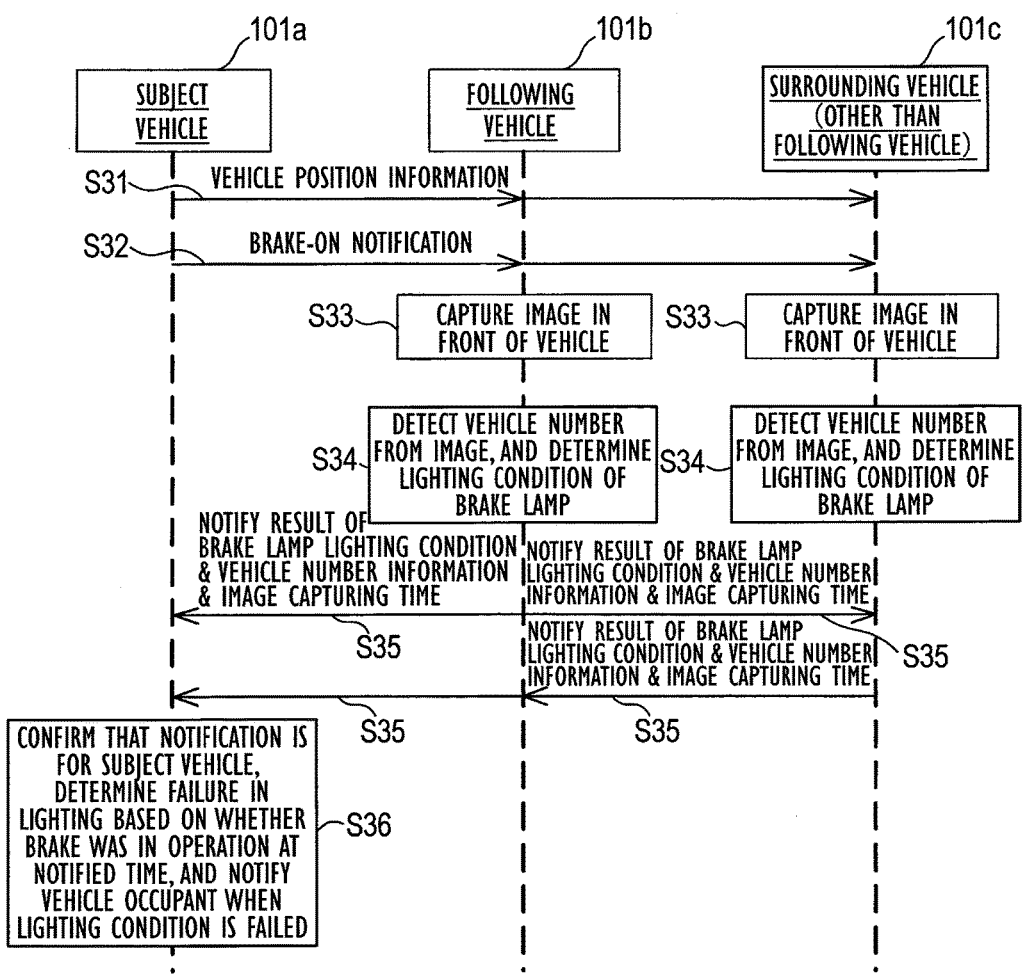
FIG. 5 is a sequence diagram explaining processing of a failure detection system in a fourth embodiment.

Further, the in-vehicle device 1 of the present embodiment is different in contents of the processing from the in-vehicle device 1 of the first embodiment. In the present embodiment, the subject vehicle 101a does not notify the information of the subject vehicle number, and the following vehicle 101b and the surrounding vehicle 101c do not determine whether or not the preceding vehicle is at a stop. Specific processing will be described based on a sequence diagram shown in FIG. 5.

(1) Processing by In-Vehicle Device 1

In the present embodiment, processing for the failure detection is started when a brake is operated in the subject vehicle 101a.

First, in S31, the subject vehicle 101a transmits vehicle position information to the outside, and the following vehicle 101b and the surrounding vehicle 101c receive the vehicle position information. This processing is similar to S1 of FIG. 2.

In next S32, the subject vehicle 101a transmits brake-on notification to the outside, and the following vehicle 101b and the surrounding vehicle 101c receive the brake-on notification.

In next S33, taking the reception of the brake-on notification as a trigger, the following vehicle 101b and the surrounding vehicle 101c each make the camera 19 capture a scene in front of each of the self-vehicles.

In next S34, the following vehicle 101b and the surrounding vehicle 101c each detect a number of the preceding vehicle from the captured image of the scene in front of each of the self-vehicles, the image being captured in S33, to determine the lighting condition of the brake lamp 11 from the captured image. Detection of the number is similar processing to the detection of the number in S5 of FIG. 2, and determination of the lighting condition is similar processing to S6 of FIG. 2.

In next S35, the following vehicle 101b and the surrounding vehicle 101c each transmit, to the outside, information of the time when the image, from which the lighting condition has been determined, was captured, in addition to the result of the lighting condition of the brake lamp 11 and the second vehicle number information. The in-vehicle devices 1 other than the transmitting source receive the information and the result.

In next S36, when the second vehicle number information transmitted in S35 matches with the number of the subject vehicle 101a, the subject vehicle 101a confirms that the result of the lighting condition, transmitted in S35, is notification to the subject vehicle 101a.

Then, the subject vehicle 101a determines a failure in the lighting condition from the brake operation time information stored in the RAM 35, and the result of the lighting condition and the time information which were transmitted in S35. Specifically, the subject vehicle 101a determines that there is a failure in the brake lamp 11 when the brake lamp 11 is not lighting even at the time of the brake being in operation, or when the brake lamp 11 is lighting even at the time of the brake being not in operation.

When the lighting condition is failed, the subject vehicle 101a makes it displayed on the display screen of the display device 27 that the brake lamp 11 is failed, to notify the failure to the vehicle occupant such as the driver.

(2) Effect

Similarly to the first embodiment, the failure detection system of the fourth embodiment can confirm whether or not the light of the lamp is actually being visually recognized from the outside.

Further, in the failure detection system of the present embodiment, similarly to the failure detection system of the third embodiment, the time at which the following vehicle 101b captured the image in S33 is checked with the time at which the subject vehicle 101a operated the brake, to detect a failure in the brake lamp 11. It is thus possible to execute the failure detection on the brake lamp 11 with higher accuracy.

Fifth Embodiment (1) Overall Configuration

Figure 6:
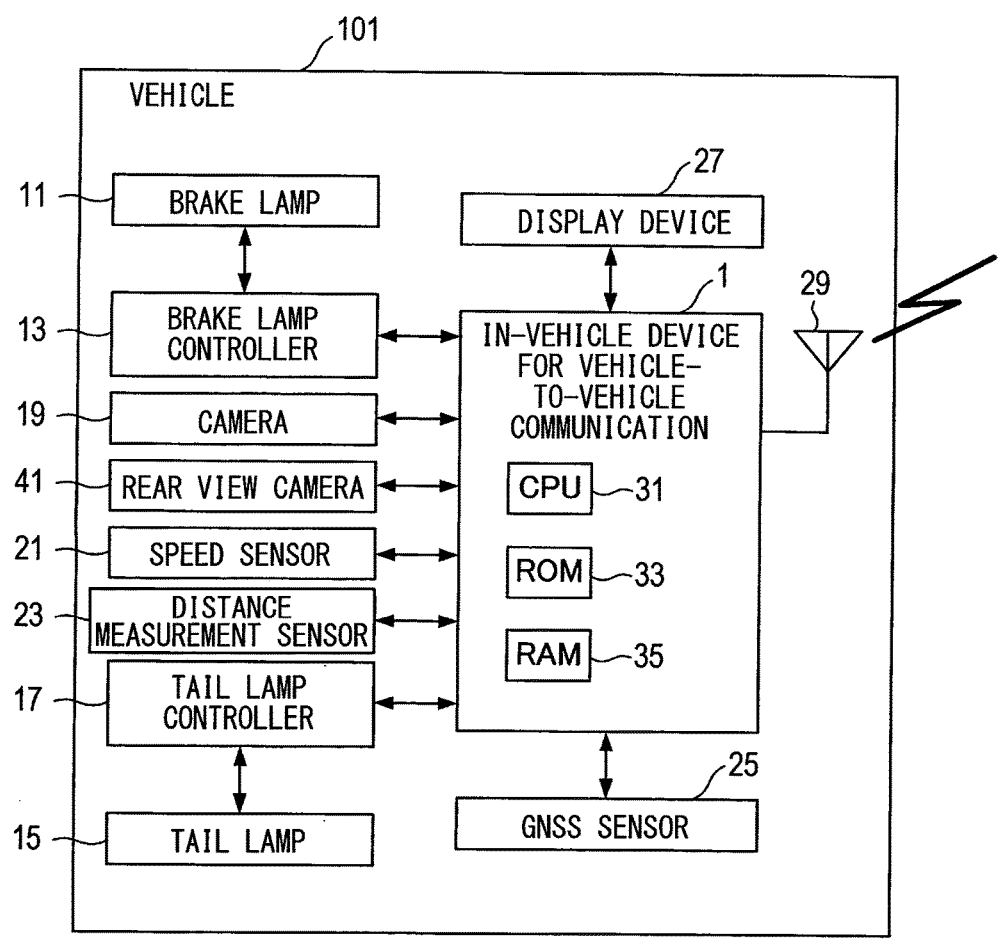
FIG. 6 is a block diagram showing a configuration of an in-vehicle device that constitutes a failure detection system in a fifth embodiment.

A failure detection system of a fifth embodiment uses an in-vehicle device 1 with a basically similar hardware configuration to that of the in-vehicle device 1 of the first embodiment. However, in the present embodiment, a rear view camera 41 is mounted in the vehicle 101 as shown in FIG. 6.

The rear view camera 41 is a CCD camera, a camera using an imaging tube, or a camera capable of acquiring an infrared image, such as an infrared camera. The rear view camera 41 is mounted at the rear of the vehicle 101, to capture an image of a scene behind the vehicle (the opposite direction to the traveling direction) in accordance with a command from the in-vehicle device 1. The captured image captured by the rear view camera 41 is outputted to the in-vehicle device 1.

Figure 7:
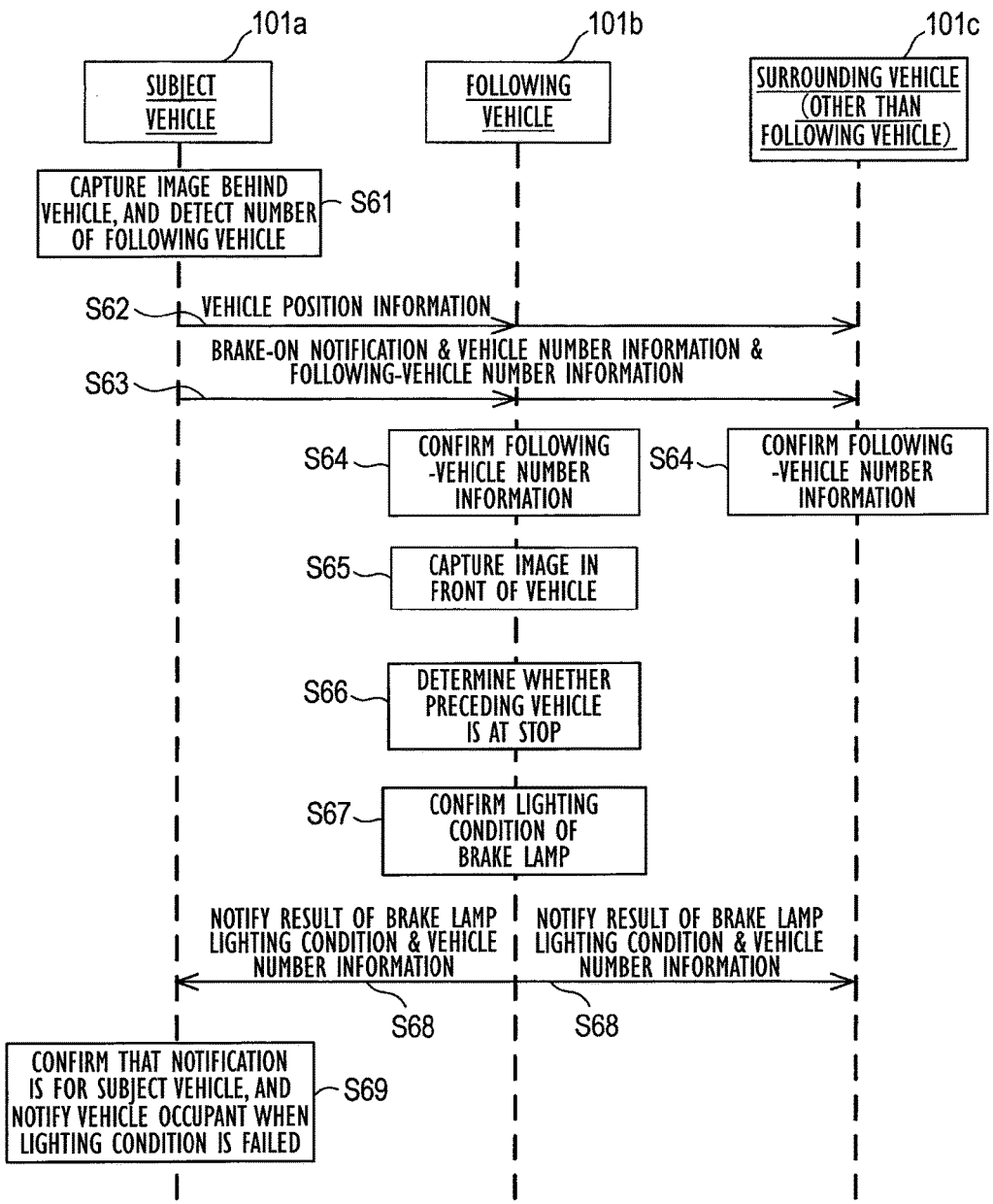
FIG. 7 is a sequence diagram explaining processing of the failure detection system in the fifth embodiment.

The in-vehicle device 1 of the present embodiment acquires a vehicle number of the following vehicle from the captured image captured by the rear view camera 41, and transmits the number to the outside of the in-vehicle device 1 by the vehicle-to-vehicle communication. Specific processing will be described based on a sequence diagram shown in FIG. 7.

(2) Processing by In-Vehicle Device 1

In the present embodiment, processing for the failure detection is started when a brake is operated in the subject vehicle 101a.

First, in S61, the subject vehicle 101a makes the rear view camera 41 capture an image of a scene behind the self-vehicle, and detects a number of the following vehicle 101b from the captured image of the scene behind the self-vehicle. The number information of the following vehicle, detected herein, will hereinafter be described as following-vehicle number information.

In next S62, the subject vehicle 101a transmits vehicle position information to the outside, and the following vehicle 101b and the surrounding vehicle 101c receive the vehicle position information. This processing is similar to S1 of FIG. 2.

In next S63, the subject vehicle 101a transmits, to the outside, the following-vehicle number information in addition to the brake-on notification and the first vehicle number information (subject vehicle number information), and the following vehicle 101b and the surrounding vehicle 101c receive the information and the notification.

In next S64, the following vehicle 101b and the surrounding vehicle 101c each confirm the following-vehicle number information transmitted from the subject vehicle 101a in S63, and determine whether or not the following-vehicle number information matches with the number of each of the self-vehicles (herein, the following vehicle 101b or the surrounding vehicle 101c). It is to be noted that the in-vehicle device 1 of each of the vehicles stores the number of each of the self-vehicles in advance.

When the transmitted number matches with the number of the self-vehicle, the following vehicle 101b executes the subsequent processing of S65. When the transmitted number does not match with the number of the self-vehicle, the surrounding vehicle 101c completes the processing in this S64.

In next S65, the following vehicle 101b makes the camera 19 capture an image of a scene in front of the self-vehicle.

In next S66, the following vehicle 101b determines whether or not the preceding vehicle located in front of the self-vehicle is at a stop. This processing is similar to S4 of FIG. 2. In this S66, when the preceding vehicle is not at a stop, the following vehicle 101b completes the processing. When the preceding vehicle is at a stop, the following vehicle 101b shifts the processing to S67.

In next S67, the following vehicle 101b determines the lighting condition of the brake lamp 11 from the captured image of the scene in front of the self-vehicle, captured in S65. This processing is similar processing to S6 of FIG. 2.

In next S68, the following vehicle 101b transmits a result of the lighting condition of the brake lamp 11 and the first vehicle number information to the outside. The subject vehicle 101a and the surrounding vehicle 101c receive the result and the information. The result of the lighting condition is either lighting or non-lighting. The first vehicle number information is the information transmitted from the subject vehicle 101a in S63.

In next S69, when the first vehicle number information transmitted in S68 matches with the number of the subject vehicle 101a, the subject vehicle 101a confirms that the result of the lighting condition, transmitted in S68, is notification to the subject vehicle 101a. When the lighting condition is failed, the subject vehicle 101a makes it displayed on the display screen of the display device 27 that the brake lamp 11 is failed, to notify the failure to the vehicle occupant such as the driver.

(3) Effect

Similarly to the first embodiment, the failure detection system of the fifth embodiment can confirm whether or not the light of the lamp is actually being visually recognized from the outside.

Further, in the failure detection system of the present embodiment, the subject vehicle 101a transmits the following-vehicle number information which is the number of the following vehicle 101b to the following vehicle 101b and the surrounding vehicle 101c. Accordingly, by comparing the received following-vehicle number information with the number of the self-vehicle, the surrounding vehicle 101c can recognize that the self-vehicle is a vehicle different from the following vehicle 101b, namely, a vehicle not required to determine lighting of the brake lamp of its preceding vehicle.

This eliminates the need for the surrounding vehicle 101c to perform processing such as lighting determination of the brake lamp and detection of the preceding-vehicle number from the captured image of the scene in front of the self-vehicle, thereby enabling suppression of an increase in processing load and an increase in load of wireless communication.

Sixth Embodiment

A failure detection system of a sixth embodiment uses an in-vehicle device 1 with the same hardware configuration as that of the in-vehicle device 1 of the first embodiment, and the rear view camera 41 similar to that of the fifth embodiment is mounted on the vehicle 101. However, contents of the processing in the in-vehicle device 1 are different from those in the fifth embodiment. In the present embodiment, the subject vehicle 101a does not notify the following-vehicle number information, but notifies body color information of the following vehicle 101b.

Figure 8:
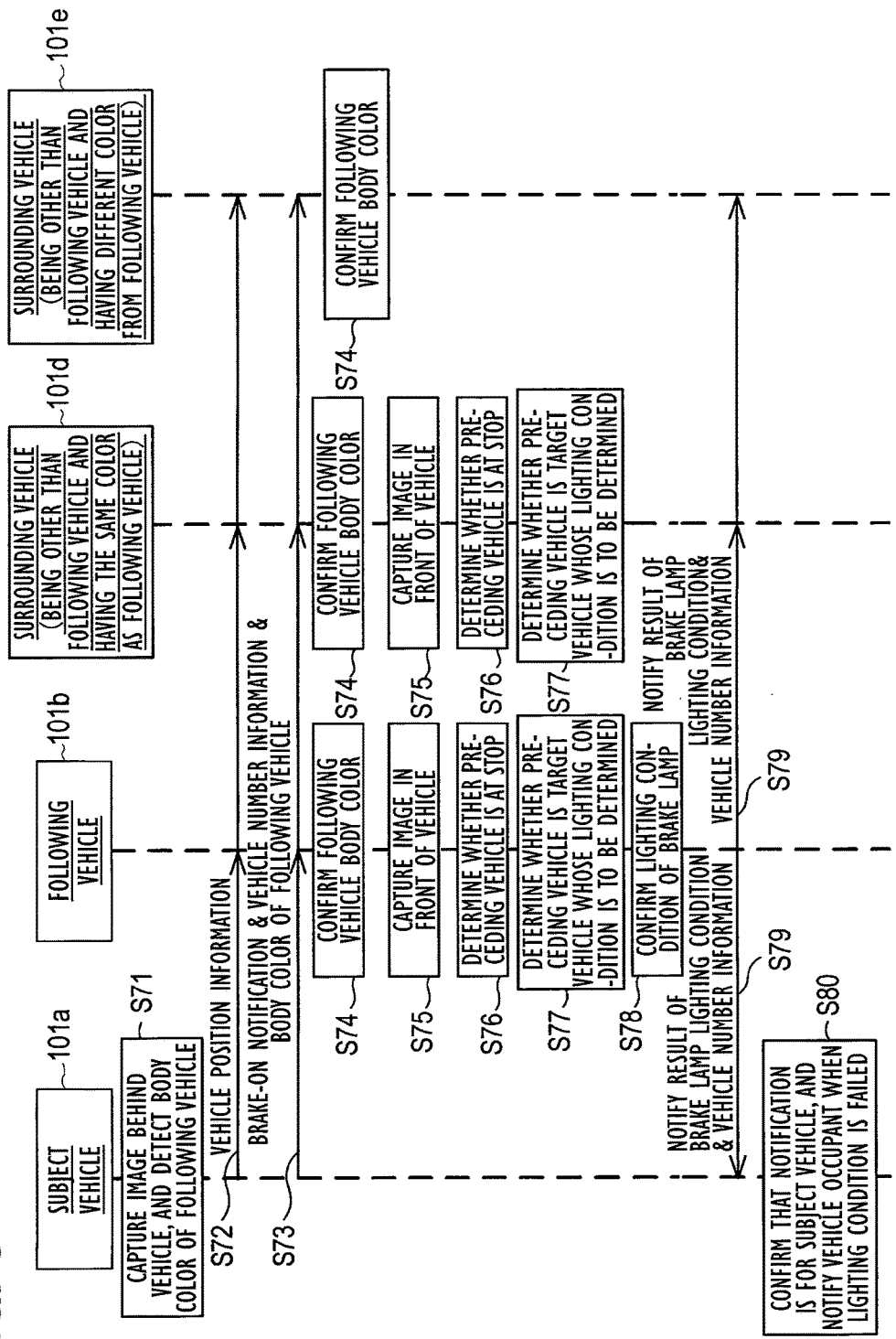
FIG. 8 is a sequence diagram explaining processing of a failure detection system in a sixth embodiment.

Specific processing will be described based on a sequence diagram shown in FIG. 8. In FIG. 8, a surrounding vehicle 101d and a surrounding vehicle 101e appear in place of the surrounding vehicle 101c. While the surrounding vehicles 101d, 101e are vehicles which are present within the communication area of the subject vehicle 101a and mounted with the in-vehicle devices 1 and exclude the following vehicle 101b, the surrounding vehicle 101d is a vehicle having a body color which is the same as or similar to that of the following vehicle 101b, and the surrounding vehicle 101e is a vehicle having a body color which is different from that of the following vehicle 101b.

(1) Processing by In-Vehicle Device 1

In the present embodiment, processing for the failure detection is started when a brake is operated in the subject vehicle 101a.

First, in S71, the subject vehicle 101a makes the rear view camera 41 capture an image of a scene behind the self-vehicle, and detects a body color of the following vehicle 101*b* from the captured image of the scene behind the self-vehicle. Since a method for detecting a body color from a captured image is known, a description thereof will be omitted, but as an example, a technique described in JP 2006-155126-A can be used.

In next S72, the subject vehicle 101*a* transmits vehicle position information to the outside, and the following vehicle 101*b* and the surrounding vehicles 101*d*, 101*e* receive the vehicle position information. This processing is similar to S1 of FIG. 2.

In next S73, the subject vehicle 101*a* transmits, to the outside, the body color information of the following vehicle in addition to the brake-on notification and the first vehicle number information (subject vehicle number information), and the following vehicle 101*b* and the surrounding vehicles 101*d*, 101*e* receive the information and the notification.

In next S74, the following vehicle 101*b*, the surrounding vehicle 101*d* and the surrounding vehicle 101*e* each confirm the body color information of the following vehicle, the information transmitted from the subject vehicle 101*a* in S73, and determine whether or not the body color is the same as or similar to the body color of each of the self-vehicles. It is to be noted that the in-vehicle device 1 of each of the vehicles stores the body color of each of the self-vehicles in advance.

When the transmitted body color information matches with the body color of each of the self-vehicles, the following vehicle 101*b* and the surrounding vehicle 101*d* execute the subsequent processing of S65. When the transmitted body color does not match with the number of the self-vehicle, the surrounding vehicle 101*e* completes the processing in this S74.

In next S75, the following vehicle 101*b* and the surrounding vehicle 101*d* each make the camera 19 capture an image of a scene in front of each of the self-vehicles.

In next S76, the following vehicle 101*b* and the surrounding vehicle 101*d* each determine whether or not a preceding vehicle located in front of each of the self-vehicles is at a stop. This processing is similar to S4 of FIG. 2. In this S76, when the preceding vehicle is not at a stop, the following vehicle 101*b* and the surrounding vehicle 101*d* complete the processing. When the preceding vehicle is at a stop, the following vehicle 101*b* and the surrounding vehicle 101*d* shift the processing to S77.

In next S77, the following vehicle 101*b* and the surrounding vehicle 101*d* each detect a number of the preceding vehicle from the captured image of the scene in front of each of the self-vehicles, the image being captured in S75, to determine whether or not the preceding vehicle is a target vehicle whose lighting condition is to be determined.

The following vehicle 101*b* and the surrounding vehicle 101*d* each compare the number detected from the captured image with the number shown by the first vehicle number information transmitted from the subject vehicle 101*a* in S72. Then, the following vehicle 101*b* and the surrounding vehicle 101*d* determine that it is a vehicle whose lighting condition is to be determined when the numbers match, and determine that it is not the vehicle to be subjected to such determination when the numbers do not match.

In next S78, the following vehicle 101*b* determines the lighting condition of the brake lamp 11 from the captured image of the scene in front of the self-vehicle, the image being captured in S75. This processing is similar processing to S6 of FIG. 2.

In next S79, the following vehicle 101*b* transmits a result of the lighting condition of the brake lamp 11 and the first vehicle number information to the outside. Further, the subject vehicle 101*a* and the surrounding vehicles 101*d*, 101*e* receive the result and the information. The first vehicle number information is the information transmitted from the subject vehicle 101*a* in S73.

In next S80, when the first vehicle number information transmitted in S79 matches with the number of the subject vehicle 101*a*, the subject vehicle 101*a* confirms that the result of the lighting condition, transmitted in S79, is notification to the subject vehicle 101*a*. When the lighting condition is failed, the subject vehicle 101*a* makes it displayed on the display screen of the display device 27 that the brake lamp 11 is failed, to notify the failure to the vehicle occupant such as the driver.

(2) Effect

Similarly to the first embodiment, the failure detection system of the sixth embodiment can confirm whether or not the light of the lamp is actually being visually recognized from the outside.

Further, in the failure detection system of the present embodiment, the subject vehicle 101*a* transmits the body color information of the following vehicle 101*b* to the following vehicle 101*b* and the surrounding vehicles 101*d*, 101*e*. Accordingly, by comparing the received body color information with the body color information of the self-vehicle, the surrounding vehicle 101*e* can recognize that the self-vehicle is a vehicle different from the following vehicle 101*b*, namely, a vehicle not required to determine lighting of the brake lamp of its preceding vehicle.

This eliminates the need for the surrounding vehicle 101*e* to perform the subsequent processing, thereby enabling suppression of an increase in processing load.

It is to be noted that a body color shown by a captured image captured by the rear view camera 41 changes depending on surroundings such as ambient brightness caused by a time, a weather, a traveling place and the like. It is thought that those changes are considered in determining matching of body colors.

For example, it is thought that the subject vehicle 101*a* transmits a body color corrected in accordance with the surroundings in S73, or that the following vehicle 101*b* and the surrounding vehicles 101*d*, 101*e* each correct the body color of each of the self-vehicles in accordance with the surroundings and then make the comparison.

[Effects of Disclosure]

As shown in each of the above embodiments, the failure detection system of the present disclosure includes: an in-vehicle device 1 for vehicle-to-vehicle communication (an example of the information processing device in the present disclosure), the in-vehicle device being mounted in a following vehicle 101*b*, and another in-vehicle device 1 (an example of the vehicle-mounted device in the present disclosure) mounted in a subject vehicle 101*a* that is a vehicle different from the vehicle mounted with the above in-vehicle device 1. The failure detection system is configured such that these in-vehicle devices 1 are communicable with each other by wireless communication.

In the description below, the in-vehicle device 1 mounted in the vehicle 101*b* will be taken as an information processing device B and the in-vehicle device 1 mounted in the vehicle 101*a* will be taken as a vehicle-mounted device A, for convenience of the description.

The information processing device B determines whether or not a lamp (brake lamp 11) of a vehicle present on the periphery of (in front of) the information processing device B is lighting based on a captured image captured by a camera 19 (an example of the imaging device in the present disclosure) for capturing an image of the periphery of the vehicle 101*b* mounted with the information processing device B.

Further, the information processing device B acquires first vehicle number information (an example of the vehicle identification information in the present disclosure) which is information being able to identify the vehicle to be a target for determination as to whether or not the lamp is lighting (the lighting determination in the present disclosure).

Then, the information processing device B transmits result information, which is information showing a result of the lighting determination, and the first vehicle number information to the vehicle-mounted device A.

The vehicle-mounted device A determines whether or not the vehicle, identified by the transmitted first vehicle number information, is the self-vehicle. When determining that it is the self-vehicle, the vehicle-mounted device A produces an output in accordance with the result shown by the result information Therefore, the failure detection system of the present disclosure can confirm whether or not the light of the lamp is actually being visually recognized from the outside through use of the vehicle-to-vehicle communication.

Further, in the failure detection system of each of the first embodiment, the second embodiment, the fifth embodiment, and the sixth embodiment, the information processing device B determines whether or not the vehicle 101*a* mounted with the vehicle-mounted device A is at a stop. When determining that the vehicle 101*a* is at a stop, the information processing device B determines whether or not the lamp of the vehicle 101*a* which is present in front of the information processing device B is lighting, and transmits result information of the determination and second vehicle number information to the vehicle-mounted device A.

When the vehicle is at a stop, the probability is high that the brake is in operation and the brake lamp 11 is lighting, and hence the transmitted lighting condition result is likely to be a result obtained at a time when the brake is in operation. Hence it is possible to suppress transmission of the result, obtained at a time when the brake is not in operation, to the vehicle-mounted device A, so as to perform the failure determination with high accuracy.

Moreover, in the failure detection system of each of the first embodiment, the third embodiment, and the sixth embodiment, the vehicle-mounted device A transmits to the information processing device B the first vehicle number information (mounting vehicle information) which is information being able to identify the vehicle 101*a* mounted with the vehicle-mounted device A. The information processing device B determines whether or not a vehicle present in front of the information processing device B is the vehicle identified by the first vehicle number information transmitted from the vehicle-mounted device A.

When determining the vehicle present in front of the information processing device B is the vehicle identified by the first vehicle number information, the vehicle-mounted device A determines whether or not the brake lamp 11 of the vehicle, on which the determination has been made, is lighting, and transmits result information of the determination and the first vehicle number information to the vehicle-mounted device A.

Thus, since the result of the lighting condition is transmitted only when the first vehicle number information received along with the brake-on notification matches with the number of the preceding vehicle, it is possible to suppress transmission of a result of the lamp lighting condition regardless of the preceding vehicle being a non-related vehicle, so as to suppress an increase in network traffic.

Further, in the failure detection system of each of the above embodiments, the vehicle-mounted device A transmits to the information processing device B a signal (brake-on information) to be a trigger for starting determination as to whether or not the brake lamp 11 of the vehicle present in front of the information processing device B is lighting.

Upon receipt of the brake-on information, the information processing device B determines whether or not the brake lamp 11 of the vehicle present in front of the information processing device B is lighting, and transmits result information of the determination and the second vehicle number information to the vehicle-mounted device A.

This can suppress a state in which, although a vehicle requesting the failure detection (a vehicle in which the vehicle-mounted device A is mounted and the device is requesting the failure detection) is not present, the information processing device B executes processing to determine lighting of the brake lamp 11 and output the information, resulting in an increased load of the in-vehicle device and increased network traffic.

Further, in the failure detection system of each of the above embodiments, the vehicle number is used as information for identifying the vehicle. In each of the first embodiment, the third embodiment, the fifth embodiment, and the sixth embodiment, the vehicle-mounted device A transmits the number of the vehicle mounted with the vehicle-mounted device A to the information processing device B, and the information processing device B acquires the vehicle number transmitted from the vehicle-mounted device A.

In each of the second embodiment and the fourth embodiment, the information processing device B acquires a number of the preceding vehicle on which the determination as to whether or not the brake lamp 11 is lighting has been performed from a captured image captured by the camera for capturing an image of a scene in front of the information processing device B.

Hence it is possible to identify the preceding vehicle with high accuracy. By identifying the preceding vehicle with high accuracy, the information showing the lighting condition can be appropriately used, to improve the accuracy in failure detection.

Further, in each of the fifth embodiment and the sixth embodiment, from a captured image captured by the rear view camera 41 for capturing an image of a scene behind the vehicle mounted with the vehicle-mounted device A, the vehicle-mounted device A extracts feature information (a vehicle number or a body color) showing a feature of a vehicle traveling behind the vehicle. The vehicle-mounted device A then transmits the extracted feature information to the information processing device B.

Based on the transmitted feature information and a feature (vehicle number or body color) of the vehicle mounted with the information processing device B, the information processing device B determines whether or not to execute the lighting determination. When determining to execute the lighting determination, the information processing device B determines whether or not the brake lamp 11 of the preceding vehicle is lighting, and transmits result information of the determination to the vehicle-mounted device A.

Thus, when the information processing device B determines not to perform the lighting determination on the preceding vehicle on the basis of the feature information transmitted from the vehicle-mounted device A, the information processing device B does not execute processing such as lighting determination and transmission of determination result, thereby enabling reduction in processing load and suppression of an increase in traffic.

Other Embodiments

In each of the above embodiments, the configuration has been exemplified where the in-vehicle device 1 mounted in the following vehicle 101*b* determines the brake lamp lighting condition of the preceding vehicle. However, the in-vehicle device 1 for determining the brake lamp lighting condition is not restricted to the configuration of being mounted in the vehicle.

For example, a road-side machine installed on a road may have an equivalent configuration to that of the in-vehicle device 1, and it may be configured to perform lighting determination on the brake lamp 11 of a vehicle present on the periphery of the road-side machine. In that case, the road-side machine performs processing, such as the lighting determination, on a vehicle present on the periphery of a region in which the road-side machine is installed, while communicating with the in-vehicle device 1 mounted in the vehicle.

Further, two in-vehicle devices 1 mounted in the subject vehicle 101*a* and the following vehicle 101*b* are not necessarily required to have the entirely equivalent configuration, and the in-vehicle device 1 mounted in the subject vehicle 101*a* may be configured to have only a function the in-vehicle device needs. As an example, the in-vehicle device 1 mounted in the subject vehicle 101*a* may not be connected to the camera since the in-vehicle device 1 does not need to acquire a captured image, or may not have the function of determining a lamp lighting condition (S2 to S6 of FIG. 2, etc.).

Further, in each of the above embodiments, the configuration has been exemplified where the in-vehicle devices 1 capable of executing the vehicle-to-vehicle communication directly communicate with each other. However, the in-vehicle devices 1 may indirectly communicate with each other. For example, it may be configured such that the in-vehicle device 1 in each of vehicles performs road-to-vehicle communication with a road-side machine arranged along a road, and communication between the vehicles is achieved via the road-side machine. Further, a communication mode and a configuration of transmitted data are not particularly restricted, and a variety of modes and configurations can be adopted.

Moreover, in each of the above embodiments, the configuration has been exemplified where reception of the brake-on notification in the in-vehicle device 1 of the following vehicle 101*b* is taken as a trigger, to start determination of a lamp lighting condition. However, the trigger may not be the brake-on notification. For example, it may be configured such that the in-vehicle device 1 of the subject vehicle 101*a* transmits a signal to be a trigger at fixed time intervals or at a predetermined time, or it may be configured such that a signal indicating that a vehicle speed has become a predetermined speed, or a signal in accordance with operation (e.g., pressing a failure diagnosis button, not shown) other than braking, is taken as a trigger.

Further, it may be configured such that the in-vehicle device 1 of the subject vehicle 101*a* does not transmit a signal to be a trigger. In that case, it is considered that the in-vehicle device 1 of the following vehicle 101*b* or the road-side machine having an equivalent function, for example, produces information showing a lamp lighting condition from a captured image of the preceding (peripheral) vehicle and second vehicle number information at predetermined time intervals, and transmits the information to the outside. In this case, the in-vehicle device 1 of the subject vehicle 101*a* may not have the function of transmitting information, but may only include the function of receiving information.

Moreover, it may be configured such that information (to be a trigger) showing whether or not to start determination of a lamp lighting condition is added with the brake-on notification. Since the lamp condition does not frequently change, adding the above information can suppress execution of determination of the lamp lighting condition in a larger number of times than necessary.

Furthermore, it may be configured such that the above trigger information is transmitted only when the presence of a vehicle behind the subject vehicle is detected through use of the vehicle-to-vehicle communication. This can reduce useless communication between vehicles.

Further, in each of the above embodiments, the configuration has been exemplified where the vehicle number is used as the information for identifying the vehicle. However, information other than the vehicle number may be used. A variety of information can be used so long as being information, with which a vehicle on the periphery of the vehicle to be a target for the brake lamp lighting determination, can identify the target vehicle from the outside.

For example, the vehicle can be identified from position information and time information. The in-vehicle device 1 of the following vehicle 101*b* acquires position information of the preceding vehicle associated with the time, and transmits those pieces of information to the outside with information showing a lighting condition determined from a captured image. The in-vehicle device 1 of the subject vehicle 101*a* is configured so as to store the position information of the self-vehicle associated with the time, and by checking the information of the position of the self-vehicle and the time with the received information, the in-vehicle device 1 can determine whether or not the information is information showing the lighting condition of the subject vehicle.

Further, information other than the number, such as a marker like a design or a letter or a vehicle type, may be identified from the captured image, and that information may be taken as information for identifying the vehicle.

Moreover, the subject vehicle 101*a* and the following vehicle 101*b* may communicate with each other, directly using an ID of the in-vehicle device 1 of the communicating destination vehicle. For example, in S7, the configuration has been exemplified where the information including the vehicle number is transmitted by broadcast and the subject vehicle 101*a* having received the signal recognizes it as transmission to the subject vehicle. However, it may be configured such that the following vehicle 101*b* receives an ID of the in-vehicle device 1 of the subject vehicle 101*a* in S2 and transmits a determination result to that ID as an address in S7.

Further, in each of the above embodiments, the configuration has been exemplified where the lighting condition of the brake lamp 11 of the preceding vehicle present in front of the vehicle is determined. However, the lamp is not limited to the brake lamp of the preceding vehicle, and the lighting condition of any lamp can be determined so long as a lamp is present on the periphery of the vehicle, specifically at a position where an image of the lamp can be captured by the camera 19.

Moreover, in each of the above embodiments, the configuration has been exemplified where, when the brake lamp 11 is failed, the in-vehicle device 1 of the subject vehicle 101a makes the display device 27 display that fact. However, the in-vehicle device 1 may execute other processing so long as the in-vehicle device 1 produces an output in accordance with a result shown by information of the determination result of the lighting condition. For example, it may be configured such that, when the lamp is not failed, the fact that the lamp is not failed is displayed. Further, it may be configured such that a lamp for indicating a failure may be provided on an instrument panel, and the lamp is lighted. Moreover, it may be configured such that notification is made by a voice.

Further, in each of the first embodiment and the second embodiment, the configuration has been exemplified where it is determined whether or not the preceding vehicle is at a stop after the image of the scene in front of the vehicle has been captured. However, this order may be opposite. It may be configured such that an image is not captured when the preceding vehicle is not at a stop.

Moreover, in each of the above embodiments, the configuration has been exemplified where the lighting condition of the brake lamp is determined. However, it may be configured such that a lighting condition of another lamp is determined. For example, it is possible to determine a lighting condition of a tail lamp.

When the tail lamp is to be detected, the determination would be difficult when the brake lamp is lighting. Hence it is thought that the determination is performed when the brake lamp is not lighting, for example, when the vehicle is traveling. Specific processing in the in-vehicle device 1 will be described based on a sequence diagram shown in FIG. 6.

In S41, the subject vehicle 101a transmits vehicle position information to the outside.

In next S42, the subject vehicle 101a transmits tail-lamp-on notification and first vehicle number information to the outside. The following vehicle 101b and the surrounding vehicle 101c receive the notification and the information.

In next S43, taking the reception of the tail-lamp-on notification as a trigger, the following vehicle 101b and the surrounding vehicle 101c each make the camera 19 capture an image of a scene in front of each of the self-vehicles.

In next S44, the following vehicle 101b and the surrounding vehicle 101c each determine whether or not a preceding vehicle located in front of each of the self-vehicles is traveling. "Being traveling" herein means being traveling at a speed not lower than a predetermined speed.

The following vehicle 101b and the surrounding vehicle 101c can each perform calculation as to whether or not the vehicle is traveling, from a vehicle speed obtained from an output signal of the speed sensor 21, and a change in distance from each of the self-vehicles to an object in front of each of the self-vehicles, detected by the distance measurement sensor 23. When the preceding vehicle is not traveling, the following vehicle 101b and the surrounding vehicle 101c complete the processing. When the preceding vehicle is traveling, the following vehicle 101b and the surrounding vehicle 101c shift the processing to S45.

In next S45, the following vehicle 101b and the surrounding vehicle 101c each detect a number of the preceding vehicle from the captured image of the scene in front of each of the self-vehicles, the image being captured in S43, to determine whether or not the preceding vehicle is a target vehicle whose lighting condition is to be determined. The following vehicle 101b and the surrounding vehicle 101d each compare the number detected from the captured image with the number transmitted in S42. Then, the following vehicle 101b and the surrounding vehicle 101c determine that it is a vehicle whose lighting condition is to be determined when the numbers match, and determine that it is not the vehicle to be subjected to such determination when the numbers do not match.

In this S45, when it is not determined that the preceding vehicle is the vehicle whose lighting condition is to be determined, the subsequent processing is not executed. When the preceding vehicle of the surrounding vehicle 101c is not the subject vehicle 101a, it completes the processing in this S45. When the preceding vehicle of the following vehicle 101b is the subject vehicle 101a, it continues the processing.

In next S46, the following vehicle 101b determines the lighting condition of the tail lamp from the captured image.

In next S47, the following vehicle 101b transmits a result of the lighting condition of the tail lamp and second vehicle number information to the outside. The subject vehicle 101a and the surrounding vehicle 101c receive those pieces of information.

In next S48, when the second vehicle number information transmitted in S47 matches with the number of the subject vehicle 101a, the subject vehicle 101a confirms that the result of the lighting condition, transmitted in S47, is notification to the subject vehicle 101a. Then, when the lighting condition is failed, the subject vehicle 101a makes it displayed on the display screen of the display device 27 that the tail lamp is failed, to notify the failure to the vehicle occupant such as the driver.

Such a failure detection system of the present embodiment can confirm whether or not the light of the tail lamp is actually visually recognized from the outside through use of the vehicle-to-vehicle communication.

Further, it may be configured as below. The in-vehicle device 1 of the subject vehicle 101a previously stores the time at which the tail-lamp-on notification was transmitted. The in-vehicle device 1 of the following vehicle 101b receives notification of notifies the image capturing time in S47. The in-vehicle device 1 of the subject vehicle 101a then checks the times, to detect a failure in the tail lamp. In such a configuration, the following vehicle 101b may not determine whether or not the subject vehicle 101a is traveling.

The modification described in this section: "Other Embodiments" may also be adoptable to the system for performing failure detection on the tail lamp.

Further, the function that one constitutional element has in each of the above embodiments may be dispersed as a plurality of constitutional elements, or the functions that a plurality of constitutional elements have may be integrated into one constitutional element. Moreover, at least part of the configurations of the above embodiments may be replaced by a known configuration having a similar function.

Further, part of the configurations of the above embodiments may be omitted. Moreover, at least part of the configurations of the above embodiments may be added to or replaced with another configuration of the above embodiments. It should be noted that any aspect included in the technical thoughts identified by the wording described in the claims is an embodiment of the present disclosure.

Other than the failure detection system, the information processing device, and the vehicle-mounted device described above, the present disclosure can be achieved in a variety of forms, such as a program for making a computer function as an information processing device and/or a vehicle-mounted device, and a medium in which this program is recorded.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A failure detection system comprising:
an information processing device mounted in a vehicle or installed on a road; and
a vehicle-mounted device mounted in another vehicle different from the vehicle, wherein:
the information processing device and the vehicle-mounted device are communicable with each other by wireless communication;
the information processing device includes:
a lighting determination device that performs a lighting determination for determining whether a brake lamp turns on, based on a captured image captured by an imaging device for capturing an image of a periphery of the information processing device, the lamp being arranged at a rear of further another vehicle on the periphery of the information processing device, the further another vehicle transmitting a vehicle identification information that identifies the further another vehicle to the information processing device and a brake-on notification signal;
an acquisition device that acquires the vehicle identification information transmitted by the further another vehicle and identifies the further another vehicle as a target for the lighting determination of the lighting determination device; and
a transmission control device that transmits result information and the vehicle identification information acquired by the acquisition device to the vehicle-mounted device, the result information showing a result of the lighting determination of the lighting determination device; and
the vehicle-mounted device includes:
a vehicle determination device that determines whether the further another vehicle, identified by the vehicle identification information transmitted by the transmission control device, is the another vehicle mounting the vehicle-mounted device;
an output device that produces an output in accordance with the result shown in the result information when the vehicle determination device determines that the further another vehicle identified by the vehicle identification information is the another vehicle mounting the vehicle-mounted device; and
wherein, when the vehicle determination device determines that the further another vehicle identified by the vehicle identification information is the another vehicle mounting the vehicle-mounted device, and determines that a lighting condition of the brake lamp is failure, the output device notifies, to an occupant of the another vehicle, a determination result that the brake lamp arranged at the rear of the another vehicle mounting the vehicle-mounted device fails.

2. The failure detection system according to claim 1, wherein:
the information processing device further includes a stop determination device that determines whether the another vehicle mounting the vehicle-mounted device is at a stop; and
the lighting determination device performs the lighting determination when the stop determination device determines that the vehicle is at a stop.

3. The failure detection system according to claim 1, wherein:
the information processing device further includes a traveling determination device that determines whether the another vehicle mounting the vehicle-mounted device is traveling at a speed equal to or higher than a predetermined speed; and
the lighting determination device performs the lighting determination when the traveling determination device determines that the another vehicle is traveling at a speed equal to or higher than the predetermined speed.

4. The failure detection system according to claim 1, wherein:
the vehicle-mounted device further includes a second transmission control device that transmits mounting vehicle information, for identifying the another vehicle mounting the vehicle-mounted device, to the information processing device;
the information processing device further includes a second vehicle determination device that determines whether furthermore another vehicle on the periphery of the another vehicle mounting the information processing device or the furthermore another vehicle on a periphery of a region in which the information processing device is installed is the another vehicle identified by the mounting vehicle information transmitted from the second transmission control device; and
when the second vehicle determination device determined that the furthermore another vehicle as a target for determination is the another vehicle identified by the mounting vehicle information, the lighting determination device performs the lighting determination of the furthermore another vehicle determined as the target.

5. The failure detection system according to claim 1, wherein:
the vehicle-mounted device further includes a third transmission control device that transmits a signal, as a trigger for starting the lighting determination of the lighting determination device, to the information processing device; and
the lighting determination device performs the lighting determination when the information processing device receives the signal from the vehicle-mounted device.

6. The failure detection system according to claim 1, wherein:
the vehicle identification information is a vehicle identification number; and
the acquisition device acquires the vehicle identification number of the vehicle as the target for the lighting determination of the lighting determination device from the captured image captured by the imaging device.

7. The failure detection system according to claim 1, wherein:
the vehicle identification information is a vehicle identification number;

the vehicle-mounted device includes a fourth transmission control device that transmits the vehicle identification number of the another vehicle mounting the vehicle-mounted device to the information processing device; and the acquisition device acquires the vehicle identification number transmitted from the fourth transmission control device as the vehicle identification information.

8. The failure detection system according to claim 1, wherein:

the vehicle-mounted device further includes:
an information extraction device that extracts feature information, showing a feature of a vehicle traveling behind the another vehicle mounting the vehicle-mounted device, from a captured image captured by a rear imaging device for capturing a scene behind the vehicle; and
a fifth transmission control device that transmits the feature information, extracted by the information extraction device, to the information processing device;

the information processing device is a device mounted in the vehicle;

the information processing device includes:
an execution determination device that determines whether the lighting determination device executes the lighting determination based on the feature information transmitted by the fifth transmission control device and a feature of the another vehicle mounting the information extraction device; and
the lighting determination device executes the lighting determination when the execution determination device determines to execute the lighting determination.

9. The failure detection system according to claim 8, wherein:
the feature information is a vehicle identification number or a vehicle body color.

10. An information processing device for providing the failure detection system according to claim 1.

11. A vehicle-mounted device for providing the failure detection system according to claim 1.

12. An information processing device, which is mounted in a vehicle or installed on a road, and provides a failure detection system with a vehicle-mounted device mounted in another vehicle different from the vehicle, the information processing device and the vehicle-mounted device being communicable with each other by wireless communication, the information processing device comprising:

a lighting determination device that performs a lighting determination for determining whether a brake lamp turns on, based on a captured image captured by an imaging device for capturing an image of a periphery of the information processing device, the brake lamp being arranged at a rear of further another vehicle on the periphery of the information processing device, the further another vehicle transmitting a vehicle identification information that identifies the further another vehicle to the information processing device and a brake-on notification signal;

an acquisition device that acquires the vehicle identification information transmitted by the further another vehicle and identifies the further another vehicle as a target for the lighting determination of the lighting determination device; and a transmission control device that transmits result information and the vehicle identification information acquired by the acquisition device to the vehicle-mounted device, the result information showing a result of the lighting determination of the lighting determination device, wherein:

the vehicle-mounted device includes:
a vehicle determination device that determines whether the further another vehicle, identified by the vehicle identification information transmitted by the transmission control device, is the another vehicle mounting the vehicle-mounted device;
an output device that produces an output in accordance with the result shown in the result information when the vehicle determination device determines that the further another vehicle identified by the vehicle identification information is the another vehicle mounting the vehicle-mounted device; and wherein, when the vehicle determination device determines that the further another vehicle identified by the vehicle identification information is the another vehicle mounting the vehicle-mounted device, and determines that a lighting condition of the brake lamp is failure, the output device notifies, to an occupant of the another vehicle, a determination result that the brake lamp arranged at the rear of the another vehicle mounting the vehicle-mounted device fails.

13. A vehicle-mounted device, which provides a failure detection system with an information processing device mounted in a vehicle or installed on a road, and is mounted in another vehicle different from the vehicle, the information processing device and the vehicle-mounted device being communicable with each other by wireless communication, the information processing device including:
a lighting determination device that performs a lighting determination for determining whether a brake lamp turns on, based on a captured image captured by an imaging device for capturing an image of a periphery of the information processing device, the brake lamp being arranged at a rear of further another vehicle on the periphery of the information processing device, the further another vehicle transmitting a vehicle identification information that identifies the further another vehicle to the information processing device and a brake-on notification signal;

an acquisition device that acquires the vehicle identification information transmitted by the further another vehicle and identifies the further another vehicle as a target for the lighting determination of the lighting determination device; and a transmission control device that transmits result information and the vehicle identification information acquired by the acquisition device to the vehicle-mounted device, the result information showing a result of the lighting determination of the lighting determination device, the vehicle-mounted device comprising:
a vehicle determination device that determines whether the further another vehicle, identified by the vehicle identification information transmitted by the transmission control device, is the another vehicle mounting the vehicle-mounted device;
an output device that produces an output in accordance with the result shown by the result information when the vehicle determination device determines that the further another vehicle identified by the vehicle identification information is the another vehicle mounting the vehicle-mounted device; and wherein, when the vehicle determination device determines that the further another vehicle identified by the vehicle identification information is the another vehicle mounting the vehicle-mounted device, and determines that a lighting condition of the brake lamp is failure, the output device notifies, to an occupant of the another vehicle, a determination result that the brake lamp arranged at the rear of the another vehicle mounting the vehicle-mounted device fails; and the further another vehicle transmits vehicle identification information for identifying the further another vehicle to the information processing device and that the acquisition device acquires the vehicle identification information transmitted from the further another vehicle.

* * * * *